No. 619,796. Patented Feb. 21, 1899.
H. SENNSTROM.
COMBINED SUPPORT AND MUD GUARD FOR BICYCLES.
(Application filed Nov. 22, 1897.)
(No Model.)
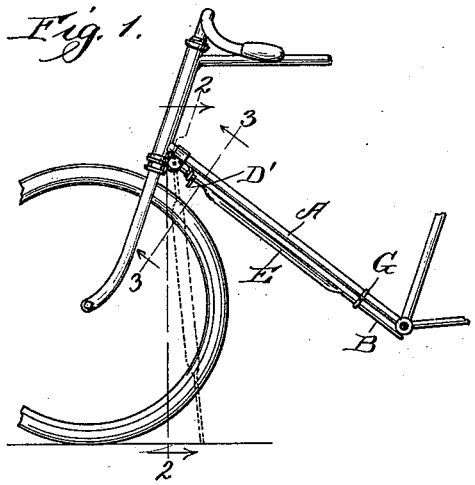
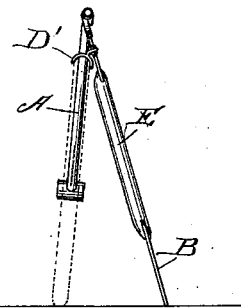
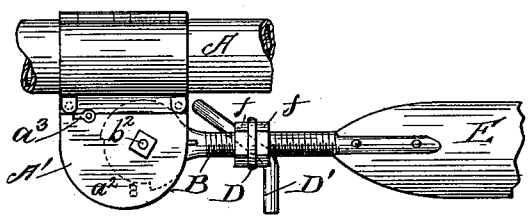
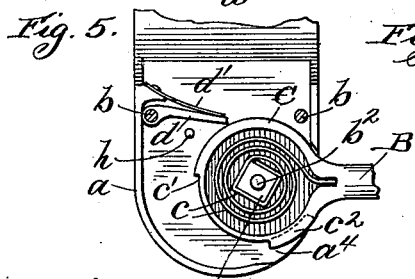
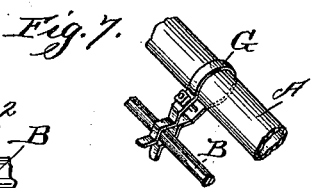
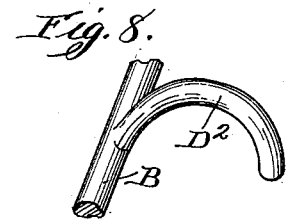
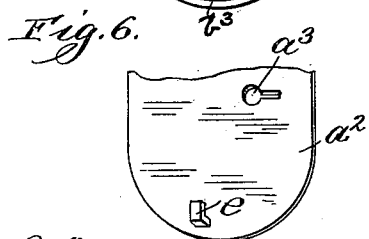
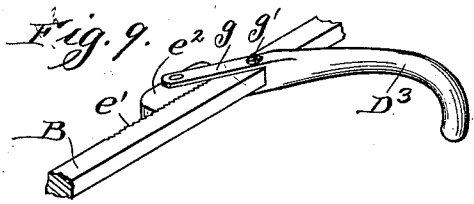
Witnesses:
W. J. Jaeker,
E. A. Duggan.
Inventor:
Harald Sennstrom
By Chas. C. Tillman Atty.
THE NORRIS PETERS CO., PHOTO-LITHO., WASHINGTON, D. C.

United States Patent Office.

HARALD SENNSTROM, OF CHICAGO, ILLINOIS.

COMBINED SUPPORT AND MUD-GUARD FOR BICYCLES.

SPECIFICATION forming part of Letters Patent No. 619,796, dated February 21, 1899.

Application filed November 22, 1897. Serial No. 659,405. (No model.)

*To all whom it may concern:*

Be it known that I, HARALD SENNSTROM, a citizen of the United States, residing at Chicago, in the county of Cook and State of Illinois, have invented certain new and useful Improvements in a Combined Support and Mud-Guard for Bicycles, of which the following is a specification.

This invention relates to improvements in a device to be attached to bicycle-frames to be used as a mud-guard for the front wheel when the bicycle is in use and to be employed for supporting the bicycle in an upright position after the rider has dismounted; and it consists in certain peculiarities of the construction, novel arrangement, and operation of the various parts thereof, as will be hereinafter more fully set forth and specifically claimed.

The object of my invention is to provide a simple, efficient, and inexpensive device for the above-named purposes which may be readily attached to the frame of a bicycle or easily removed therefrom and will present a neat and attractive appearance, affording when the bicycle is being ridden a mud-guard or protection against mud thrown from the front wheel and when the rider has dismounted furnishing a strong and durable support for the bicycle, which support will be automatically locked in its lowered position.

In order to enable others skilled in the art to which my invention pertains to make and use the same, I will now proceed to describe it, referring to the accompanying drawings, in which—

Figure 1 is a view in side elevation of a portion of a bicycle, showing by continuous lines my attachment used as a mud-guard and secured to the brace-tube extending from the crown-head to the crank-hanger and illustrating by dotted lines the position the device will occupy when used as a support. Fig. 2 is an end view, partly in section, taken on line 2 2 of Fig. 1, showing the bicycle supported by my device. Fig. 3 is an enlarged view, partly in section, partly in elevation, and partly in perspective, taken on line 3 3 of Fig. 1, looking in the direction indicated by the arrows and illustrating the construction of the lock mechanism and upper portion of the supporting-rod. Fig. 4 is an enlarged view in elevation of a portion of the brace-tube and a part of the supporting-rod and mud-guard, showing the manner of securing the same together. Fig. 5 is an interior view of a portion of the lock-casing and its interior mechanism. Fig. 6 is an inner view of one plate of the locking mechanism. Fig. 7 is a perspective view of a portion of the brace-tube, showing a clamp thereon for securing the supporting-rod thereto. Fig. 8 is a perspective view of a portion of the upper part of the supporting-rod, illustrating a modification in its construction; and Fig. 9 is a similar view of a like part, showing still another modification therein.

Similar letters refer to like parts throughout the different views of the drawings.

A represents the brace-tube of a bicycle-frame, which extends from the crown-head to the crank-hanger, to the upper portion of which is secured a lock A', which comprises a hollow or shell-like casing $a$, which is provided with a curved portion $a'$ to partly surround the said brace-tube. Hinged to the curved part $a'$ is another portion or lid $a^2$ of the lock, which is provided at a suitable point with a keyhole $a^3$ for the reception of a suitable key. When the lid or part $a^2$ of the casing of the lock is secured in position, which may be done by means of bolts $b$, passing through said lid and the casing $a$, and nuts $b'$ on the ends of said bolts, the lock will thereby be securely attached to the brace-tube, as is apparent.

The lower portion of the lock-casing is provided with a slot $a^4$ for the reception and operation of the upper part of the supporting-rod B, which rod is pivotally secured within the casing on a bolt or pin $b^2$ and by means of a nut $b^3$ on said pin within the casing, to which nut is secured one end of a spring $c$, the other end of which is secured to the said rod in any desired manner and at any suitable place and actuates the same. That portion of the rod B located within the lock-casing is usually made in the form of a hollow disk C, within the cavity of which the spring $c$ lies. The periphery of the disk C is provided with a recess $c'$ to engage the tumbler $d$, which is pivotally secured at one of its ends to the lock-casing and has its free end held normally in contact with the disk C by means of a spring $d'$, secured on the lock-casing. On the inner surface of the lid $a^2$ is a hooked projection $e$, which is adapted to engage the flange $c^2$ on the disk of the supporting-rod, and will thus prevent the lid being raised when the supporting-rod is in a lowered position should the bolts $b$, which secure the lid $a^2$ to the casing $a$, be removed, for it is apparent that the bolt $b^2$ and the rod B thereon cannot be removed without the removal of the nut $b^3$, which is impossible while the projection $e$ on the lid $a^2$ engages the flange $c^2$ on the disk of the supporting-rod.

As shown in Fig. 4 of the drawings, the upper portion of the supporting-rod B is screw-threaded and has located on said portion set-nuts $f$, between which is placed a collar D on the curved arm D', which rests on the tire of the bicycle-wheel when the device is being used for a support and serves to brace the same and prevent it turning. By using a set-nut $f$ on either side of the collar D it is evident that said collar and the arm D', which it carries, can be adjusted to any desired point to suit wheels of different sizes. Instead of using the adjusting means for the arm D', I may provide the supporting-rod B with an arm $D^2$, formed integral therewith, as shown in Fig. 8 of the drawings, or I may form the upper portion of the supporting-rod B rectangular in cross-section, with teeth or notches $e'$ on one of its surfaces to engage a toothed block $e^2$, which is pivotally secured between the forks $g$ of a curved arm $D^3$, which arm, as well as the arm $D^2$, is designed to rest on the tire of the wheel in the same manner and for a like purpose as that stated in regard to the arm D' illustrated in Fig. 4 of the drawings. The arm $D^3$ (see Fig. 9) is provided with a set-screw $g'$ to fix it at the desired point on the supporting-rod, in which position it will be securely held by reason of the engagement of the teeth on the block $e^2$ with the teeth $e'$ on the supporting-rod. The supporting-rod is provided with a broadened portion or shield E, which extends nearly its entire length and affords a mud-guard for the front wheel, as will be clearly seen and readily understood by reference to Fig. 1 of the drawings.

Secured on the lower portion of the brace-tube A is a clamp G, the free end of which is bent so as to receive the lower portion of the supporting-rod B and will hold it in alinement with the brace-tube in such a manner as to prevent it striking the same or producing a rattling noise.

The operation of my device is simple and as follows: When it is desired to use the attachment as a mud-guard, the supporting-rod B, having the broadened portion or shield E, is placed and held parallel with the tube A by means of the spring-clamp G, from which it can be quickly and easily released when it is desired to use the attachment as a support for bicycles. This is done by pressing the rod B downwardly and forwardly, which operation will cause the tumbler $d$ to engage the notch or recess $c'$ on the disk C of the supporting-rod, in which position it will be held or locked by reason of the spring $d'$ actuating the tumbler until it is desired to raise the support, when by inserting a key through the keyhole $a^3$ and over the guide-pin $h$ therefor and turning the same the tumbler $d$ will be disengaged from the notch or recess $c'$ on the disk of the supporting-rod, at which time the spring $c$ will exert itself and raise the bar to a parallel position with the brace-tube of the bicycle-frame, where it may be held by means of the spring-clamp G or other device, should one be deemed necessary.

Having thus fully described my invention, what I claim as new, and desire to secure by Letters Patent, is—

1. The combination of a lock, comprising the piece $a$, having the slot $a^4$, in its lower portion, the piece or lid $a^2$, having the hooked projection $e$, on its inner surface, the spring-actuated tumbler $d$, pivotally secured between the parts $a$, and $a^2$, with a supporting-rod having its upper end pivotally secured within the casing of the lock and formed with a circular portion provided with a notch or recess to engage the tumbler, and having on said circular portion a flange $c^2$, adapted to engage the projection $e$, on the lid of the lock, when the rod is in a lowered position, and a nut on the pivot-pin of the supporting-rod, within the casing, substantially as described.

2. The combination of a lock, comprising the piece $a$, having the slot $a^4$, in its lower portion, the piece or lid $a^2$, having the hooked projection $e$, on its inner surface, the spring-actuated tumbler $d$, pivotally secured between the parts $a$, and $a^2$, with a supporting-rod having its upper end pivotally secured within the casing of the lock and formed with a circular portion provided with a notch or recess to engage the tumbler, and having on said circular portion a flange $c^2$, adapted to engage the projection $e$, on the lid of the lock, when the rod is in a lowered position, a nut on the pivot-pin of said rod, within the casing, a spring secured at one of its ends to the said nut on the pivot-pin of the supporting-rod and at its other end to said rod, and a curved arm located on the supporting-rod near the lock and adapted to rest on the tire of the wheel, when the supporting-rod is in a lowered position, substantially as described.

Chicago, Illinois, November 20, 1897.

HARALD SENNSTROM.

Witnesses:
CHAS. C. TILLMAN,
E. A. DUGGAN.